(12) United States Patent
Nakatani et al.

(10) Patent No.: US 7,338,642 B2
(45) Date of Patent: Mar. 4, 2008

(54) EXHAUST GAS PURIFICATION DEVICE FOR ENGINE

(75) Inventors: Koichiro Nakatani, Mishima (JP); Shinya Hirota, Susono (JP); Toshiaki Tanaka, Numazu (JP); Hiroyuki Tominaga, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 620 days.

(21) Appl. No.: 10/880,532

(22) Filed: Jul. 1, 2004

(65) Prior Publication Data

US 2005/0008548 A1    Jan. 13, 2005

(30) Foreign Application Priority Data

Jul. 8, 2003    (JP) .............................. 2003-193726

(51) Int. Cl.
*B01D 50/00* (2006.01)
*B01D 53/43* (2006.01)

(52) U.S. Cl. ........................ 422/180; 422/178; 422/181

(58) Field of Classification Search .................. 55/523; 422/179–182, 221, 222; 428/96
See application file for complete search history.

(56) References Cited

U.S. PATENT DOCUMENTS

| | | | | |
|---|---|---|---|---|
| 4,519,820 | A * | 5/1985 | Oyobe et al. ................... | 55/284 |
| 4,662,911 | A * | 5/1987 | Hirayama et al. ............. | 55/282 |
| 5,259,190 | A * | 11/1993 | Bagley et al. ................. | 60/300 |
| 5,272,875 | A * | 12/1993 | Kaji .............................. | 60/299 |
| 5,897,846 | A * | 4/1999 | Kharas et al. ............ | 423/213.2 |
| 7,153,336 | B2 * | 12/2006 | Itoh et al. ...................... | 55/523 |
| 2002/0189247 | A1 | 12/2002 | Kato et al. | |
| 2004/0065068 | A1 * | 4/2004 | Otsubo et al. ................. | 55/523 |

FOREIGN PATENT DOCUMENTS

| | | |
|---|---|---|
| EP | 1 304 152 A1 | 4/2003 |
| EP | 1 304 455 A1 | 4/2003 |
| EP | 1 375 849 A2 | 1/2004 |
| JP | 60-43113 | 3/1985 |
| JP | 61-62216 | 4/1986 |
| JP | 1-318715 | 12/1989 |
| JP | 8-508199 | 9/1996 |
| JP | A 2001-205108 | 7/2001 |
| JP | A 2001-317334 | 11/2001 |
| JP | 2002-364339 | 12/2002 |
| JP | A 2003-047813 | 2/2003 |
| JP | A 2004-108331 | 4/2004 |
| JP | A 2004-251137 | 9/2004 |

\* cited by examiner

*Primary Examiner*—Walter D. Griffin
*Assistant Examiner*—Frank C Campanell
(74) *Attorney, Agent, or Firm*—Oliff & Berridge, PLC

(57) ABSTRACT

A main particulate filter having a relatively large volume is arranged in an exhaust passage of an engine, and an auxiliary particulate filter having a relatively small volume is arranged in the exhaust passage upstream of the main particulate filter. The main and auxiliary particulate filters are arranged so that the open downstream ends of the single open end-type exhaust gas passages of the auxiliary particulate filter and the open upstream ends of the open upstream end-type exhaust gas passages of the main particulate filter substantially face each other, and the open downstream ends of the both open end-type exhaust gas passages of the auxiliary particulate filter and the closed upstream ends of the open downstream end-type exhaust gas passages of the main particulate filter substantially face each other. A catalyst having an oxidation function is carried on the auxiliary particulate filter.

9 Claims, 5 Drawing Sheets

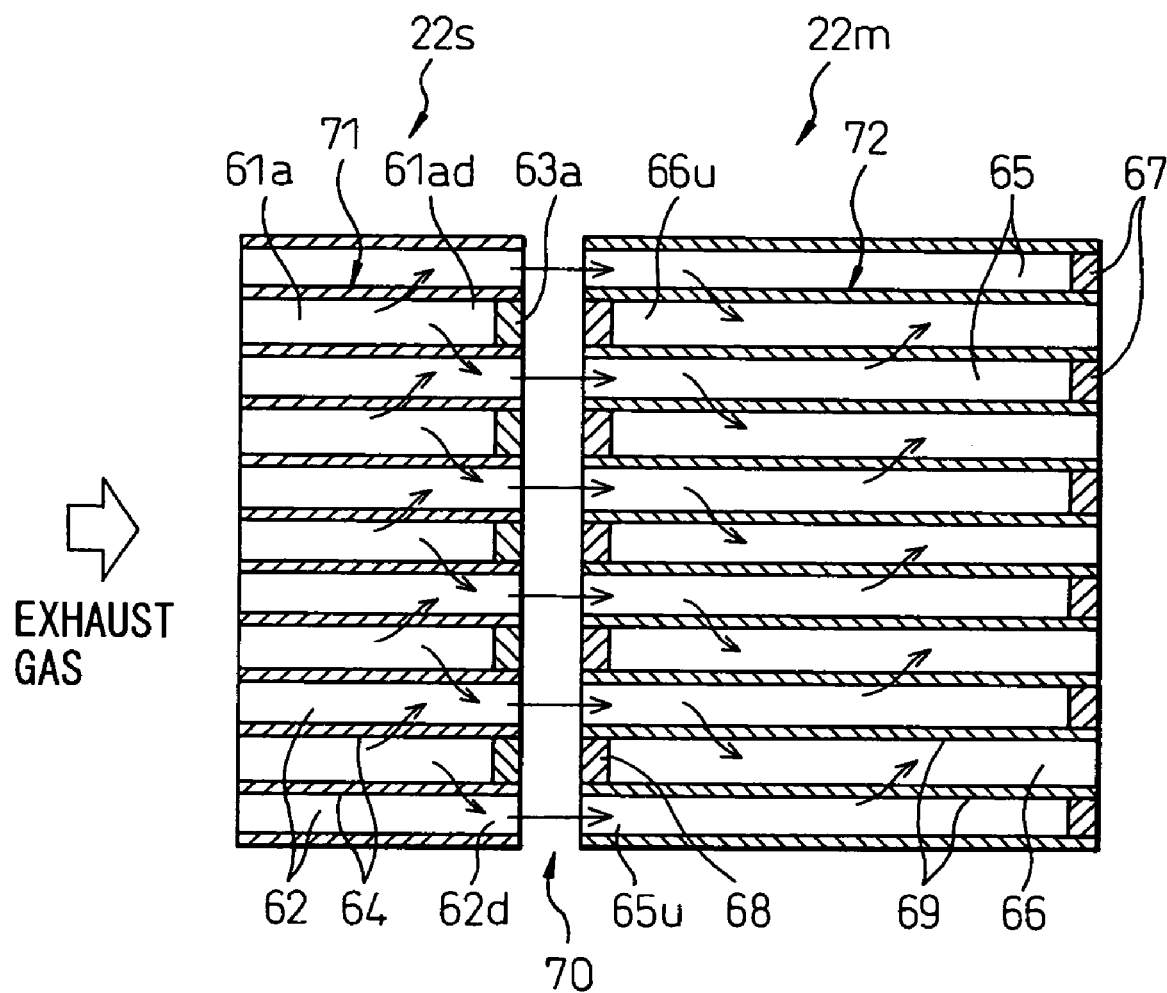

EXHAUST GAS PURIFICATION DEVICE FOR ENGINE

BACKGROUND OF THE INVENTION

1. Field of the Invention

The present invention relates to an exhaust gas purification device for an engine.

2. Related Art

In a known an exhaust gas purification device for a diesel engine, an oxidation catalyst for oxidizing nitrogen monoxide NO in the exhaust gas into nitrogen dioxide $NO_2$ is arranged in the exhaust passage and a particulate filter for trapping particulates in the exhaust gas is arranged in the exhaust passage downstream of the oxidation catalyst (see Japanese Unexamined Patent Publication No. 2001-318715). Specifically, the air-fuel ratio of the exhaust gas flowing into the particulate filter is maintained lean and, therefore, when the temperature of the particulate filter becomes relatively high, particulates, mainly composed of solid carbon, deposited on the particulate filter are oxidized and removed. In this case, if $NO_2$ is contained in the exhaust gas flowing into the particulate filter, it promotes oxidation of particulates and reduces the temperature, of the particulate filter, required for oxidizing particulates. In the exhaust gas purification device described above, therefore, the oxidation catalyst is arranged upstream of the particulate filter to convert NO in the exhaust gas into $NO_2$.

An amount of $NO_2$ flowing into the particulate filter, however, depends on an amount of NO discharged from the combustion chamber and may vary in accordance with the engine operating condition. Accordingly, if a condition in which the amount of NO discharged from the combustion chamber is small, and is continued for a long time, oxidation of particulates fails to be promoted and, therefore, the particulate filter may be clogged.

SUMMARY OF THE INVENTION

An object of the present invention is to provide an exhaust gas purification devise for an engine, capable of surely preventing the particulate filter from being clogged.

According to the present invention, there is provided an exhaust gas purification device for an engine having an exhaust passage, comprising: a main particulate filter arranged in the exhaust passage for trapping particulates in the exhaust gas, the main particulate filter comprising a plurality of exhaust gas passages extending in parallel to each other; and an auxiliary particulate filter arranged in the exhaust passage upstream of the main particulate filter, for trapping particulates in the exhaust gas, the auxiliary particulate filter comprising a plurality of exhaust gas passages extending in parallel to each other; wherein the exhaust gas passages of the main particulate filter comprise open upstream end-type exhaust gas passages each having an open upstream end and a closed downstream end, and open downstream end-type exhaust gas passages each having an open downstream end and a closed upstream end, the open upstream end-type exhaust gas passages and the open downstream end-type exhaust gas passages being arranged through partitioning walls of porous material, wherein the exhaust gas passages of the auxiliary particulate filter comprises single open end-type exhaust gas passages each having one open end and the other closed end, and both open end-type exhaust gas passages having two open ends, the single open end-type exhaust gas passages and the both open end-type exhaust gas passages being arranged through partitioning walls of porous material, and wherein a catalyst having an oxidation function is carried on the auxiliary particulate filter.

Note that, in this specification, a ratio of an amount of air fed to the exhaust passage upstream of a certain position, the combustion chamber and the intake passage, to an amount of a reducing agent such as hydrocarbon HC and carbon monoxide Co, fed to the exhaust passage upstream of the above-mentioned position, the combustion chamber and the intake passage, is referred to as an air-fuel ratio of the exhaust gas at the above-mentioned position.

The present invention may be more fully understood from the description of the preferred embodiments according to the invention as set forth below, together with the accompanying drawings.

BRIEF DESCRIPTION OF THE DRAWINGS

In the drawings:

FIG. 5 is a cross sectional view of particulate filters according to another embodiment of the present invention.

DESCRIPTION OF THE PREFERRED EMBODIMENTS

Figure 1:
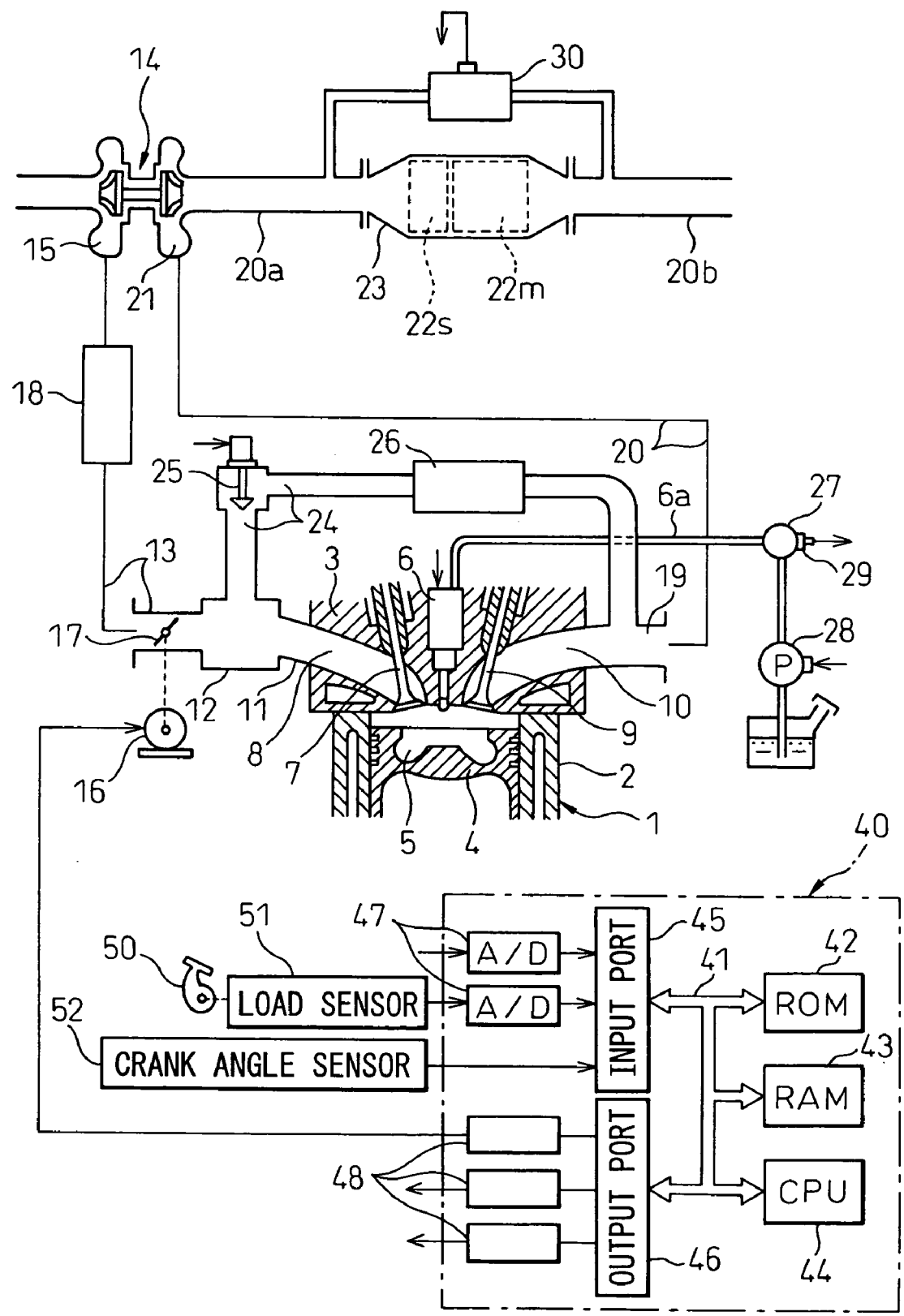
FIG. 1 is an overall view of an internal combustion engine.

FIG. 1 shows a case in which the present invention is applied to an internal combustion engine of a compression-ignition type. Alternatively, the present invention may also be applied to an internal combustion engine of a spark-ignition type.

Referring to FIG. 1, the reference numeral 1 designates an engine body, 2 designates a cylinder block, 3 designates a cylinder head, 4 designates a piston, 5 designates a combustion chamber, 6 designates an electrically-controlled fuel injector, 7 designates intake valves, 8 designates intake ports, 9 designates exhaust valves and 10 designates exhaust ports. The intake ports 8 are connected to a surge tank 12 through corresponding intake branches 11, and the surge tank 12 is connected to a compressor 15 of an exhaust turbo-charger 14 through an intake duct 13. A throttle valve 17 driven by a step motor 16 is arranged in the intake duct 13, and a cooling unit 18 for cooling the intake air flowing through the intake duct 13 is arranged around the intake duct 13. On the other hand, the exhaust ports 10 are connected to an exhaust turbine 21 of the exhaust turbo charger 14 through an exhaust manifold 19 and an exhaust pipe 20, and the outlet of the exhaust turbine 21 is connected through an exhaust pipe 20a to a casing 23 accommodating particulate filters 22m, 22s. The outlet of the casing 23 is connected further to an exhaust pipe 20b.

As shown in FIG. 1, the particulate filters 22m, 22s are configured of a main particulate filter 22m having a relatively large volume and an auxiliary particulate filter 22s having a relatively small volume. The auxiliary particulate filter 22s is arranged upstream of the main particulate filter 22m. In other words, the particulate filters 22m, 22s are arranged in series.

The exhaust manifold 19 and the surge tank 12 are connected to each other through an exhaust gas recirculation (hereinafter, referred to as EGR) passage 24, and an electrically-controlled EGR control valve 25 is arranged in the EGR passage 24. Also, a cooling unit 26 for cooling the EGR gas flowing through the EGR passage 24 is arranged around the EGR passage 24.

On the other hand, each fuel injector 6 is connected to a fuel reservoir, i.e., to a common rail 27, through a fuel supply pipe 6*a*. Fuel is supplied into the common rail 27 from an electrically-controlled fuel pump 28 of which a discharge amount is variable, and fuel supplied into the common rail 27 is supplied to the fuel injector 6 through each fuel supply pipe 6*a*. A fuel pressure sensor 29 for detecting fuel pressure in the common rail 27 is mounted on the common rail 27. Based on the output signal of the fuel pressure sensor 29, the discharge amount of the fuel pump 28 is controlled to maintain the fuel pressure in the common rail 27 at a target fuel pressure.

An electronic control unit 40 is constituted of a digital computer including a ROM (read-only memory) 42, a RAM (random access memory) 43, a CPU (microprocessor) 44, an input port 45 and an output port 46, which are connected to each other through a bidirectional bus 41. The output signal of the fuel pressure sensor 29 is input to the input port 45 through a corresponding A/D converter 47. Also, the exhaust pipes 20*a*, 20*b* have mounted thereon a pressure sensor 30 for detecting the pressure difference between the upstream-side exhaust gas pressure and the downstream-side exhaust gas pressure of the particulate filters 22*m*, 22*s*, i.e., the pressure drop at the particulate filters 22*m*, 22*s*. The output signal of the pressure sensor 30 is input to the input port 45 through the corresponding A/D converter 47.

On the other hand, an accelerator pedal 50 is connected with a load sensor 51 for generating an output voltage proportional to a depression L of the accelerator pedal 50. The output voltage of the load sensor 51 is input through the corresponding A/D converter 47 to the input port 45. Further, the input port 45 is connected with a crank angle sensor 52 for generating an output pulse for each rotation of 30°, for example, of the crankshaft. The output port 46 is connected through corresponding drive circuits 48 to the fuel injectors 6, the step motor 16 for driving the throttle valve, the EGR control valve 25 and the fuel pump 28.

Figure 2A:
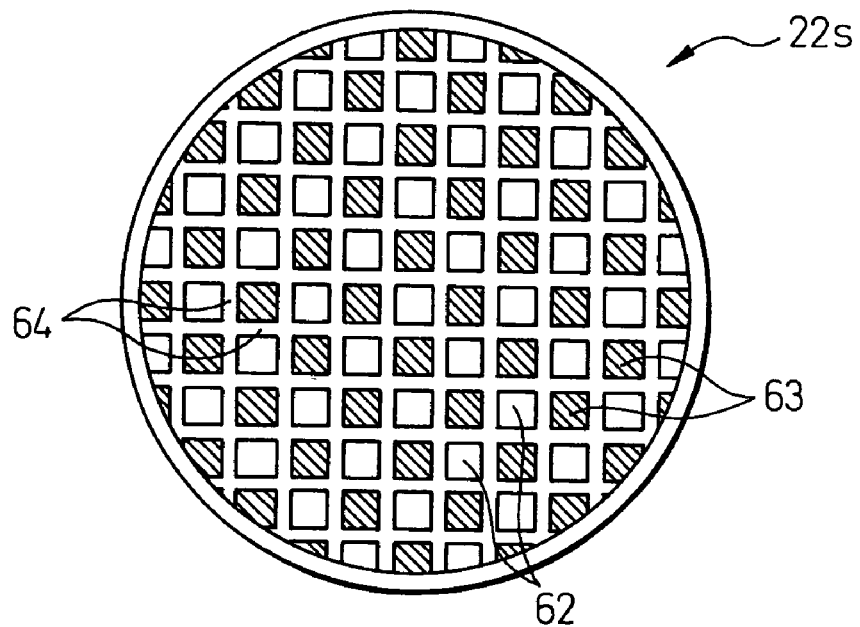
FIGS. 2A and 2B are end and cross sectional views of particulate filters according to an embodiment of the present invention.
Figure 2B:
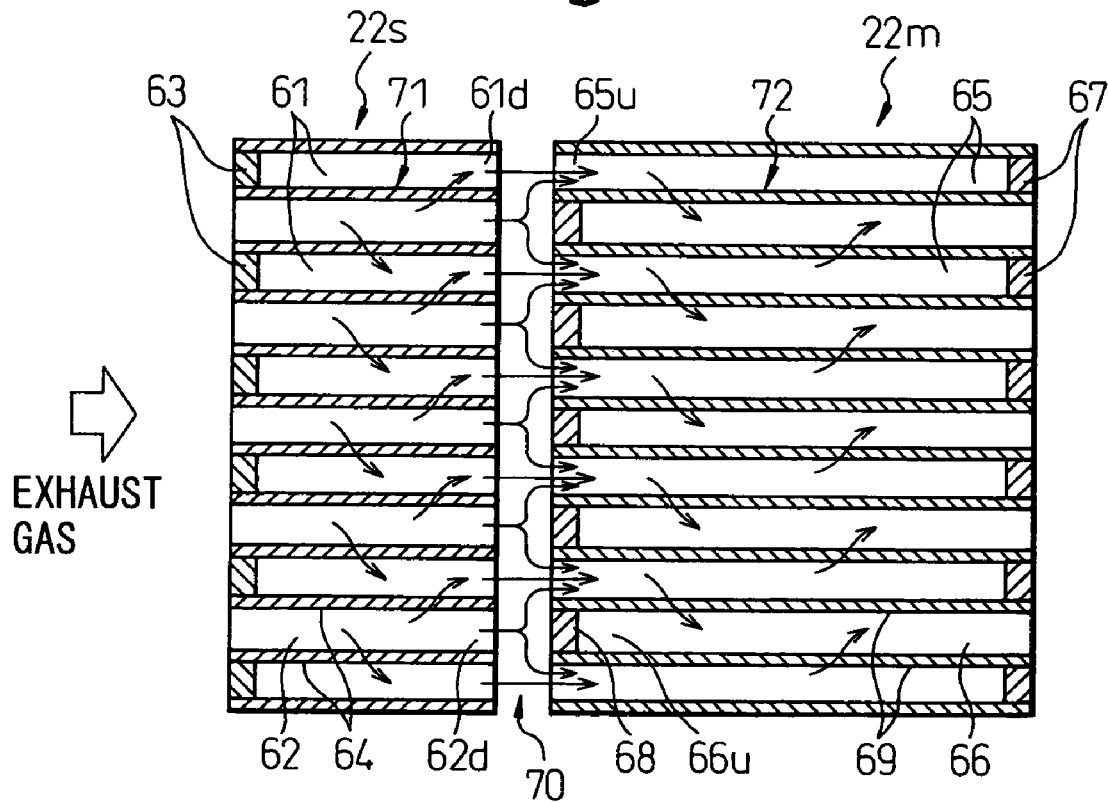

FIGS. 2A and 2B show a structure of the particulate filters 22*m*, 22*s*. Specifically, FIG. 2A is an upstream-side end view of the auxiliary particulate filter 22*s*, and FIG. 2B is a side sectional view of the particulate filters 22*m*, 22*s*. Note that the end surfaces of the main particulate filter 22*m* have a similar configuration to the upstream-side end surface of the auxiliary particulate filter 22*s*.

As shown in FIGS. 2A and 2B, the auxiliary particulate filter 22*s* has a honeycomb structure formed of a porous material such as cordierite, and comprises a plurality of exhaust gas passages 61, 62 extending in parallel to each other. These exhaust gas passages are configured of single open end-type exhaust gas passages 61 each having an upstream end closed by a plug 63 and an open downstream end, and both open end-type exhaust gas passages 62 each having two open ends. In FIG. 2A, the hatched portions indicates the plugs 63. The single open end-type exhaust gas passages 61 and the both open end-type exhaust gas passages 62 are arranged alternately via thin partitioning walls 64. In other words, the single open end-type exhaust gas passages 61 and the both open end-type exhaust gas passages 62 are arranged so that each single open end-type exhaust gas passage 61 is surrounded by four both open end-type exhaust gas passages 62 and each both open end-type exhaust gas passage 62 is surrounded by four single open end-type exhaust gas passages 61.

On the other hand, the main particulate filter 22*m* also has a honeycomb structure formed of a porous material such as cordierite, and comprises a plurality of exhaust gas passages 65, 66 extending in parallel to each other. These exhaust gas passages are configured of open upstream end-type exhaust gas passages 65 each having an open upstream end and a downstream end closed by a plug 67, and open downstream end-type exhaust gas passages 66 each having an open downstream end and an upstream end closed by a plug 68. These open upstream end-type exhaust gas passages 65 and open downstream end-type exhaust gas passages 66 are arranged alternately via thin partitioning walls 69. In other words, the open upstream end-type exhaust gas passages 65 and open downstream end-type exhaust gas passages 66 are arranged so that each open upstream end-type exhaust gas passage 65 is surrounded by four open downstream end-type exhaust gas passages 66 and each open downstream end-type exhaust gas passage 66 is surrounded by four open upstream end-type exhaust gas passages 65.

Also, as can be seen from FIG. 2B, a slight gap 70 is formed between the auxiliary particulate filter 22*s* and the main particulate filter 22*m*.

Further, the particulate filters 22*m*, 22*s* are arranged so that the open downstream ends 61*d* of the single open end-type exhaust gas passages 61 of the auxiliary particulate filter 22*s* and the open upstream ends 65*u* of the open upstream end-type exhaust gas passages 65 of the main particulate filter 22*m* substantially face each other, and the open downstream end 62*d* of the both open end-type exhaust gas passages 62 of the auxiliary particulate filter 22*s* and the closed upstream end 66*u* of the open downstream end-type exhaust gas passages 66 of the main particulate filter 22*m* substantially face each other.

In addition, according to the embodiments of the present invention, carrier layers of aluminum, for example, are formed on both side surfaces of the partitioning walls 64 and on the inner walls of micropores of the partitioning walls 64, of the auxiliary particulate filter 22*s*, on which carrier layers a catalyst 71 having the oxidation function is carried.

Similarly, carrier layers of aluminum, for example, are formed on both side surfaces of the partitioning walls 69 and on the inner walls of micropores of the partitioning walls 69, of the main particulate filter 22*m*, on which carrier layers a catalyst 72 having the oxidation ability is carried. The catalyst 71, 72 may be formed of precious metal such as platinum Pt.

The exhaust gas that has flowed into the casing 23, first, flows into the both open end-type exhaust gas passages 62 of the auxiliary particulate filter 22*s*. A part of this exhaust gas then flows into the adjacent single open end-type exhaust gas passages 61 through the surrounding partitioning walls 64, as indicated by arrows in FIG. 2B. Then, after flowing out of the auxiliary particulate filter 22*s* through the open downstream ends 61*d* of the single open end-type exhaust gas passages 61, the above-mentioned the exhaust gas part flows into the open upstream end-type exhaust gas passages 65 of the main particulate filter 22*m*.

The remaining part of the exhaust gas that has flowed into the both open end-type exhaust gas passages 62, on the other hand, proceeds to the both open end-type exhaust gas passages 62, and flows out of the auxiliary particulate filter 22*s* through the open downstream ends 62*d* and, then, flows into the open upstream end-type exhaust gas passages 65 of the main particulate filter 22*m*.

The exhaust gas that has flowed into the open upstream end-type exhaust gas passages 65 of the main particulate filter 22m then flows into the adjoining open downstream end-type exhaust gas passages 66 through the partitioning walls 69, and then flows out of the main particulate filter 22m through the open downstream ends 66d of the open downstream end-type exhaust gas passages 66.

During the process, particulates, mainly composed of solid carbon and contained in the exhaust gas, are trapped and deposited on the partitioning walls 69, 64 of the particulate filters 22m, 22s. Specifically, a part of particulates discharged from the engine is trapped on the auxiliary particulate filter 22s, and the remaining particulates, i.e. particulates that have passed through the auxiliary particulate filter 22s, are trapped on the main particulate filter 22m.

In this case, open downstream ends 62d of the both open end-type exhaust gas passages 62 of the auxiliary particulate filter 22s and the closed upstream ends 66u of the open downstream end-type exhaust gas passages 66 of the main particulate filter 22m are arranged to face each other, as described above, and this increases pressure around the open downstream ends 62d of the both open end-type exhaust gas passages 62. As a result, the exhaust gas that has flowed into each both open end-type exhaust gas passage 62 easily passes through the partitioning walls 64 and, therefore, particulates are easily trapped on the auxiliary particulate filter 22s.

In the internal combustion engine shown in FIG. 1, the combustion at a lean air-fuel ratio is continued, which always maintains the air-fuel ratio of the exhaust gas flowing into the particulate filters 22m, 22s at lean. Therefore, when the temperatures of the particulate filters 22m, 22s are maintained at or over, for example, 250° C. at which particulates are oxidized and the amount of particulates sent into the particulate filters 22m, 22s per unit time is not so large, particulates on the particulate filters 22m, 22s are sequentially oxidized.

In addition, the catalyst 71 having oxidation function is carried on the auxiliary particulate filter 22s and, thus, NO in the exhaust gas is oxidized into $NO_2$ by the catalyst 71. This $NO_2$ promotes particulate oxidation on the auxiliary particulate filter 22s, or flows into the main particulate filter 22m and promotes the particulate oxidation on the main particulate filter 22m.

As described above, particulates discharged from the engine are trapped not only on the main particulate filter 22m but also on the auxiliary particulate filter 22s. In other words, not all of particulates discharged from the engine are trapped on the main particulate filter 22m. Therefore, even when the engine operating condition varies to reduce an amount of $NO_2$ flowing into the main particulate filter 22m, the main particulate filter 22m is prevented from being clogged.

However, when the amount of particulates sent into the particulate filters 22m, 22s per unit time increases or the temperature of the particulate filters 22m, 22s becomes low, an amount of insufficiently oxidized particulates is increased or the amount of $NO_2$ generated in the catalyst 71 is decreased, which gradually increases the amount of particulates deposited on the particulate filters 22m, 22s.

In this case, the amount of the exhaust gas flowing through the both open end-type exhaust gas passages 62 and then flowing out of the auxiliary particulate filter 22s through the open downstream ends 62d gradually increases, due to the fact that, in the auxiliary particulate filter 22s, it becomes difficult for the exhaust gas to pass through the partitioning walls 64 with the increase in the amount of particulates deposited on the partitioning walls 64. In other words, when the amount of particulates deposited on the auxiliary particulate filter 22s reaches a certain upper limit, it hardly increases beyond the upper limit. Taking this point into consideration, it can be said that the auxiliary particulate filter 22s is a particulate filter having a trap rate which decreases with an increase in the amount of the deposited particulates. The trap rate is defined as (inflowing particulate amount−outflowing particulate amount)/inflowing particulate amount.

When the amount of particulates deposited on the auxiliary particulate filter 22s reaches the upper limit, particulates pass through the auxiliary particulate filter 22s and are trapped on the main particulate filter 22m, which suddenly increases the amount of particulates deposited on the main particulate filter 22m. In the main particulate filter 22m, all of the exhaust gas passes through the partitioning walls 69 and, therefore, the pressure drop undesirably increases with the increase in the amount of particulates deposited on the main particulate filter 22m. Taking this point into consideration, it can be said that the main particulate filter 22m is a particulate filter having a trap rate which increases with an increase in the deposited particulate amount.

Therefore, according to the embodiments of the present invention and when, for example, the amount of particulates deposited on the main particulate filter 22m exceeds a tolerable amount, a temperature increasing process is executed, in which the temperature of the particulate filters 22m, 22s is increased to a temperature required for oxidation such as 600° C. or higher, and maintained at the required temperature temporarily, while the air-fuel ratio of the exhaust gas flowing into the particulate filters 22m, 22s is kept lean.

There are different ways to execute the temperature increasing process. As an example, an electric heater may be arranged in the exhaust gas passage upstream of the particulate filters 22m, 22s, to increase the temperature of the exhaust gas flowing into the particulate filters 22m, 22s; the temperature of the exhaust gas discharged from the engine may be increased; or fuel may be supplied secondarily into the exhaust gas discharged from the engine and burnt in the particulate filters 22m, 22s. Further, in order to increase the temperature of the exhaust gas discharged from the engine, for example, the main fuel injection timing may be retarded or an additional fuel may be injected in the power or exhaust stroke in addition to the main fuel injection.

According to the embodiments of the present invention, fuel is secondarily supplied into the exhaust gas discharged from the engine and burnt in the particulate filters 22m, 22s to conduct the temperature increasing control. Also, according to the embodiments of the present invention, it is determined that the amount of particulates deposited on the particulate filters 22m, 22s exceeds the tolerable amount, when the pressure drop PD detected by the pressure sensor 30 exceeds a tolerable value P1.

In the condition where the temperature increasing process is required, the exhaust gas hardly passes through the partitioning walls 64 of the auxiliary particulate filter 22s, as described above. As a result, substantially all of fuel supplied secondarily into the exhaust gas reaches the main particulate filter 22m, without being burnt on the auxiliary particulate filter 22s, and is burnt on the main particulate filter 22m. Thus, particulates deposited on the main particulate filter 22m are oxidized and removed therefrom and, thus, the amount of particulates deposited on the main particulate filter 22m is reduced.

As described above, on the other hand, the amount of particulates deposited on the auxiliary particulate filter 22s never exceeds a certain amount. This indicates that the pressure drop of the auxiliary particulate filter 22s never exceeds a certain value and, therefore, there is no need to forcibly remove particulates deposited on the auxiliary particulate filter 22s.

Figure 3:
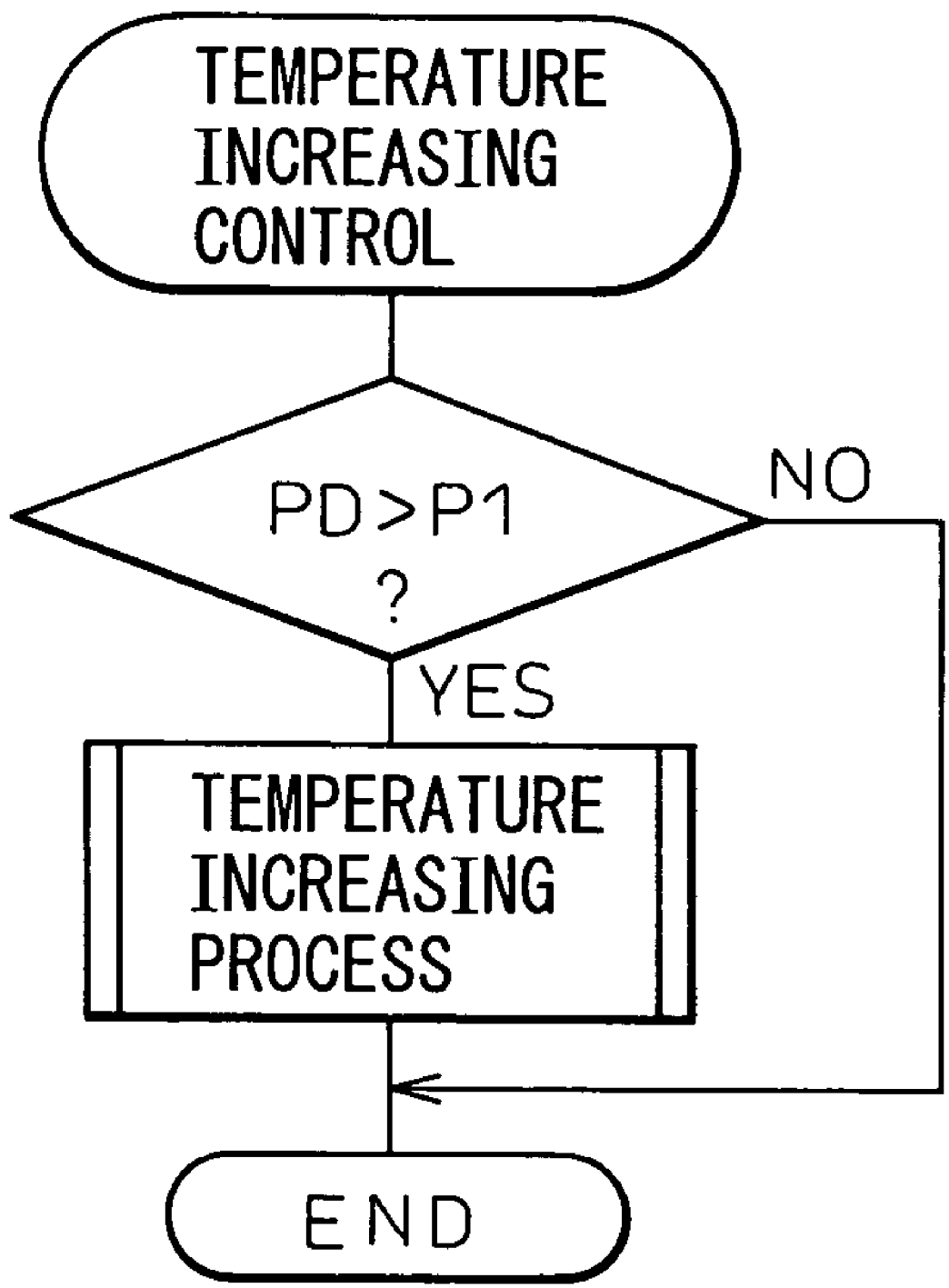
FIG. 3 is a flowchart illustration a temperature increasing control routine.

FIG. 3 shows a temperature increasing control routine according to the embodiments of the invention. This routine is executed by an interruption every predetermined time.

Referring to FIG. 3, first, in step 100, it is determined whether the pressure drop PD has exceeded the tolerable value P1. If PD≦P1, the processing cycle is ended. If PD>P1, the process proceeds to step 101 where the temperature increasing process is conducted.

Figure 4A:
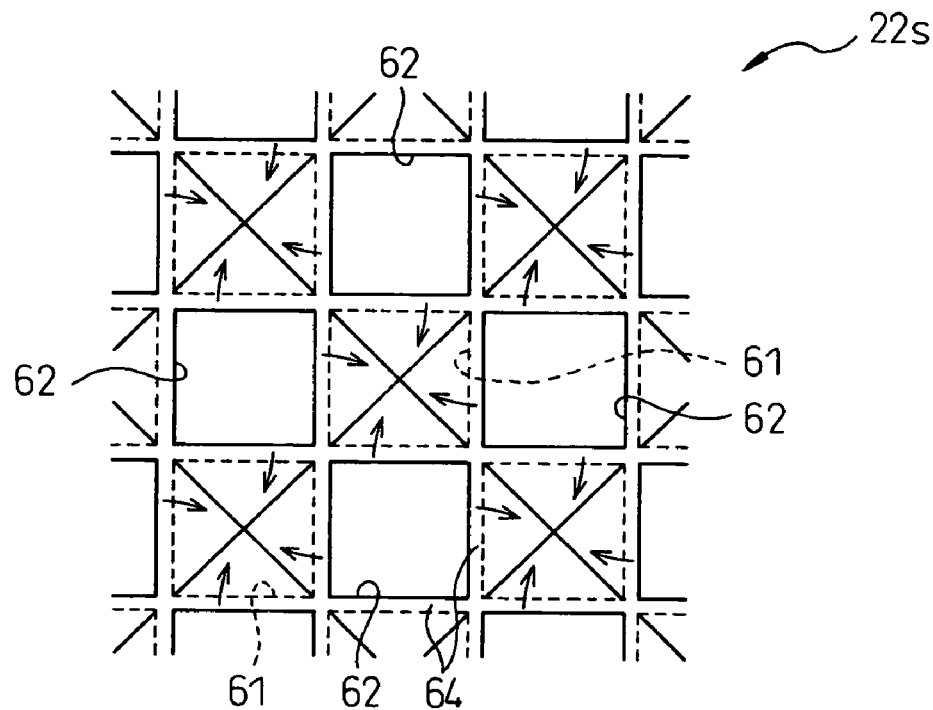
FIGS. 4A and 4B are end and cross sectional views of particulate filters according to another embodiment of the present invention.
Figure 4B:
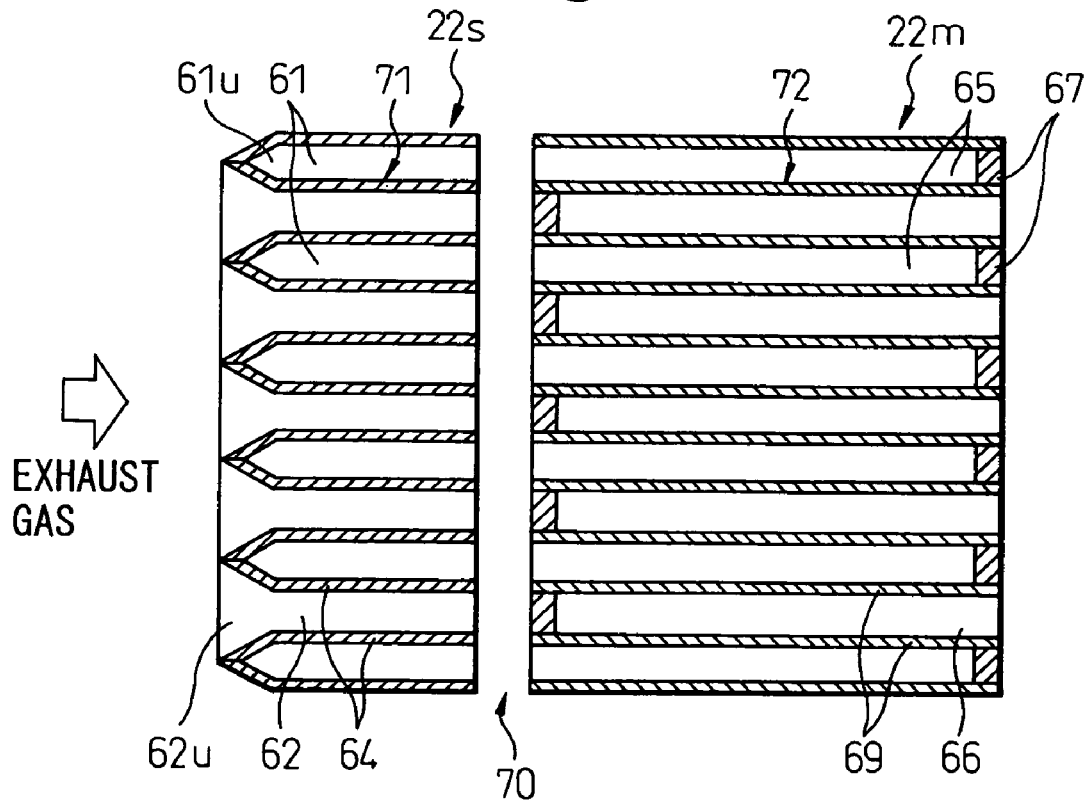

FIGS. 4A and 4B illustrate another embodiment of the present invention.

The auxiliary particulate filter 22s shown in FIGS. 4A and 4B is different in configuration from the auxiliary particulate filter shown in FIGS. 2A and 2B in that the upstream ends 61u of the single open end-type exhaust gas passages 61 are not closed by the plugs.

Specifically, parts of the partitioning walls 64 defining around the upstream ends 61u of the single open end-type exhaust gas passages 61 of the auxiliary particulate filter 22s are respectively bent inward as indicated by arrows in FIG. 4A, to thereby close the respective upstream ends 61u.

This makes a part of the exhaust gas flowing to the single open end-type exhaust gas passages 61 also through the upstream ends 61u. In addition, the upstream ends 61u of the single open end-type exhaust gas passages 61 is tapered and, therefore, a flow resistance at the upstream ends 61u is reduced.

The other structures and functions of the auxiliary particulate filter 22s are similar to those of the auxiliary particulate filter 22s shown in FIGS. 2A and 2B and therefore are not described again.

FIG. 5 shows still another embodiment of the present invention.

The auxiliary particulate filter 22s shown in FIG. 5 includes exhaust gas passages 61a, 62, which are comprised of single open end-type exhaust gas passages 61a each having an open upstream end and a downstream end closed by the plug 63a, and both open end-type exhaust gas passages 62 each having two open ends. The single open end-type exhaust gas passages 61a and the both open end-type exhaust gas passages 62 are arranged alternately via thin partitioning walls 64.

Further, the particulate filters 22m, 22s are arranged so that the open downstream end 62ds of the both open end-type exhaust gas passages 62 of the auxiliary particulate filter 22s and the open upstream ends 65u of the open upstream end-type exhaust gas passages 65 of the main particulate filter 22m substantially face each other, and the closed downstream ends 61ad of the single open end-type exhaust gas passages 61a of the auxiliary particulate filter 22s and the closed upstream ends 66u of the open downstream end-type exhaust gas passages 66 of the main particulate filter 22m substantially face each other.

The exhaust gas that has flowed into the casing 23, first, flows into the single open end-type exhaust gas passages 61a or the both open end-type exhaust gas passages 62 of the auxiliary particulate filter 22s. The exhaust gas that has flowed into the single open end-type exhaust gas passages 61a then flows into the adjoining both open end-type exhaust gas passages 62 through the surrounding partitioning walls 64, as indicated by arrows in FIG. 5. Then, the exhaust gas flows out of the auxiliary particulate filter 22s through the open downstream ends 62d of the both open end-type exhaust gas passages 62, and flows into the open upstream end-type exhaust gas passages 65 of the main particulate filter 22m.

In this case, the open downstream ends 62d of the both open end-type exhaust gas passages 62 of the auxiliary particulate filter 22s face the open upstream ends 65u of the open upstream end-type exhaust gas passages 65 of the main particulate filter 22m and, therefore, the pressure drop is reduced.

Also in the auxiliary particulate filter 22s shown in FIG. 5, it becomes difficult for the exhaust gas to pass through the partitioning walls 64 with the increase in the amount of particulates deposited on the partitioning walls 64, which gradually reduces the amount of the exhaust gas flowing through the both open end-type exhaust gas passages 62 and then flowing out of the auxiliary particulate filter 22s through the open downstream ends 62d. Accordingly, it can be said that the auxiliary particulate filter 22s shown in FIG. 5 is a particulate filter having a trap rate which decreases with the increase in the deposited particulate amount.

According to the present invention, it is possible to provide an exhaust gas purification device, for an engine, capable of surely preventing the particulate filter from being clogged.

While the invention has been described by reference to specific embodiments chosen for purposes of illustration, it should be apparent that numerous modifications could be made thereto by those skilled in the art without departing from the basic concept and scope of the invention.

The invention claimed is;

1. An exhaust gas purification device for an engine having an exhaust passage, comprising:
   a main particulate filter arranged in the exhaust passage for trapping particulates in the exhaust gas, the main particulate filter comprising a plurality of exhaust gas passages extending in parallel to each other; and
   an auxiliary particulate filter arranged in the exhaust passage upstream of the main particulate filter, for trapping particulates in the exhaust gas, the auxiliary particulate filter comprising a plurality of exhaust gas passages extending in parallel to each other;
   wherein the exhaust gas passages of the main particulate filter comprise open upstream end-type exhaust gas passages each having an open upstream end and a closed downstream end, and open downstream end-type exhaust gas passages each having an open downstream end and a closed upstream end, the open upstream end-type exhaust gas passages and the open downstream end-type exhaust gas passages being arranged through partitioning walls of porous material,
   wherein the exhaust gas passages of the auxiliary particulate filter comprises single open end-type exhaust gas passages each having one open end and the other closed end, and both open end-type exhaust gas passages having two open ends, the single open end-type exhaust gas passages and the both open end-type exhaust gas passages being arranged through partitioning walls of porous material,
   wherein a catalyst having an oxidation function is carried on the auxiliary particulate filter, and
   wherein the single open end-type exhaust gas passages of the auxiliary particulate filter have respective closed downstream ends and respective open upstream ends.

2. An exhaust gas purification device as described in claim 1, wherein the open upstream end-type exhaust gas passages and the open downstream end-type exhaust gas passages of the main particulate filter are arranged alternately through the partitioning walls, and the single open end-type exhaust gas passages and the both open end-type exhaust gas passages of the auxiliary particulate filter are arranged alternately through the partitioning walls, and wherein the main particulate filter and the auxiliary particulate filter are arranged so that the closed downstream ends of the single open end-type exhaust gas passages of the auxiliary particulate filter and the closed upstream ends of the open downstream end-type exhaust gas passages of the main particulate filter substantially face each other, and that the open downstream ends of the both open end-type exhaust gas passages of the auxiliary particulate filter and the open upstream ends of the open upstream end-type exhaust gas passages of the main particulate filter substantially face each other.

3. An exhaust gas purification device as described in claim 1, wherein the partitioning walls around the other closed ends of the single open end-type exhaust gas passages of the auxiliary particulate filter are bent inward to form respective closed ends.

4. An exhaust gas purification device as described in claim 1, wherein the other closed ends of the single open end-type exhaust gas passages of the auxiliary particulate filter are plugged to form respective closed ends.

5. An exhaust gas purification device as described in claim 1, wherein the catalyst having an oxidation function is carried also on the main particulate filter.

6. An exhaust gas purification device as described in claim 1, wherein the main particulate filter and the auxiliary particulate filter are accommodated in a common, single casing.

7. An exhaust gas purification device as described in claim 6, wherein the main particulate filter and the auxiliary particulate filter are arranged with a slight gap therebetween.

8. An exhaust gas purification device as described in claim 1, wherein the main particulate filter has a volume larger than that the auxiliary particulate filter has.

9. An exhaust gas purification device as described in claim 1, further comprising means for increasing the temperature of the main particulate filter temporarily while maintaining the air-fuel ratio of the exhaust gas flowing into the main particulate filter at lean, to oxidize particulates deposited on the main particulate filter and remove them therefrom.

* * * * *